United States Patent [19]

Heuer

[11] Patent Number: 4,905,461
[45] Date of Patent: Mar. 6, 1990

[54] MOWER SHEAVE FAN AND DRIVE COVER PORT ARRANGEMENT

[75] Inventor: Gordon E. Heuer, Horicon, Wis.
[73] Assignee: Deere & Company, Moline, Ill.
[21] Appl. No.: 290,125
[22] Filed: Dec. 27, 1988
[51] Int. Cl.$^4$ ............................................. A01D 53/00
[52] U.S. Cl. ....................................... 56/12.8; 56/13.4
[58] Field of Search ........................... 56/12.8–13.4, 56/12.9, 13.1, 13.2, 13.3; 474/93

[56] References Cited

U.S. PATENT DOCUMENTS

| | | | |
|---|---|---|---|
| 2,953,032 | 9/1960 | Ruess | 474/93 X |
| 4,018,096 | 4/1979 | Foster | 474/93 X |
| 4,361,001 | 11/1982 | Almond et al. | 56/13.4 X |
| 4,395,249 | 7/1983 | Prasad et al. | 474/93 |
| 4,527,380 | 7/1985 | Fushiya et al. | 56/12.8 |
| 4,787,196 | 11/1988 | Voler et al. | 56/12.8 X |

FOREIGN PATENT DOCUMENTS 1534021  4/1978  United Kingdom ................ 56/12.8

Primary Examiner—Thuy M. Bui

[57] ABSTRACT

A mower deck with fan structure rotatable with the blade spindle for creating an air turbulence to prevent debris buildup around the spindle and to exhaust debris away from and cool the mower drive train area. In one embodiment, an attachment including a plurality of vanes is connected to the lower side of the driven spindle sheave to create an air disturbance around the spindle. In another embodiment, the sheave is apertured and includes integral vanes projecting downwardly from the apertures. The fan structure draws air in from a first drive cover port located above the blade spindle and exhausts air and airborne debris through a second port in a high pressure side of the cover.

15 Claims, 3 Drawing Sheets

MOWER SHEAVE FAN AND DRIVE COVER PORT ARRANGEMENT

BACKGROUND OF THE INVENTION

The present invention relates generally to rotary mowers, and more specifically to structure for preventing debris buildup in the mower spindle and drive train areas.

Over extended periods of use, mower decks experience a buildup of dirt and grass debris under the belt shields and around the blade spindle. The debris buildup can accumulate to a point wherein the ability to dissipate heat from the moving parts is hindered, and shortened belt life due to heat degeneration of the belt material results. The increased heat also shortens bearing life and causes the grease to liquify quickly and run out, thereby decreasing the service interval between greasings.

BRIEF SUMMARY OF THE INVENTION

It is therefore an object of the present invention to provide an improved mower deck structure for a rotary mower. It is a further object to provide such a structure which overcomes the aforementioned problems.

It is yet another object of the present invention to provide improved mower deck structure which prevents debris buildup around the mower blade spindles. It is a further object to provide such structure which also reduces debris buildup in the drive train area of the mower deck.

It is still a further object of the present invention to provide an improved mower deck structure having a fan arrangement for creating an air flow around the blade spindle to prevent debris buildup.

It is still another object of the present invention to provide a fan arrangement for the spindle drive on a mower deck which helps reduce debris buildup in the deck. It is still a further object to provide such a fan arrangement which is relatively simple and inexpensive to fabricate and does not occupy much space on the mower deck. It is another object to provide such a fan arrangement which may be retrofitted onto existing spindle drives.

In accordance with the above objects, mower deck structure includes a blade spindle supported for rotation within the mower spindle housing and a driven sheave with fan structure attached thereto for producing a current of air around the spindle which drives debris away from the spindle. In one embodiment, the fan structure is formed integrally with the driven sheave and includes tab-like projections bent downwardly from the sheave adjacent apertures extending through the sheave body. In a second embodiment, the fan structure is retrofitted onto an existing sheave and includes an elongated, plate-like element with a central aperture nonrotatably received over the spindle and having leading notched edges with fins or vanes bent downwardly for producing a current of air around the spindle. The plate-like element fits completely on the underside of the existing driven sheave.

Ports are located in the belt drive cover, and the fan structure creates an air flow through the drive cover which exhausts debris out of the drive train area. As a result, lower operating temperatures are achieved and maintenance periods for the drive train area can be extended. The periods between clean-out of the drive train area can also be extended, and the mower deck will have a cleaner and more pleasing appearance. Belt, bearing and seal life are extended by the resultant heat reduction in the area.

These and other objects, features and advantages of the present invention will become apparent to those skilled in the art from the description which follows and from the drawings.

DESCRIPTION OF THE PREFERRED EMBODIMENT

Figure 1:
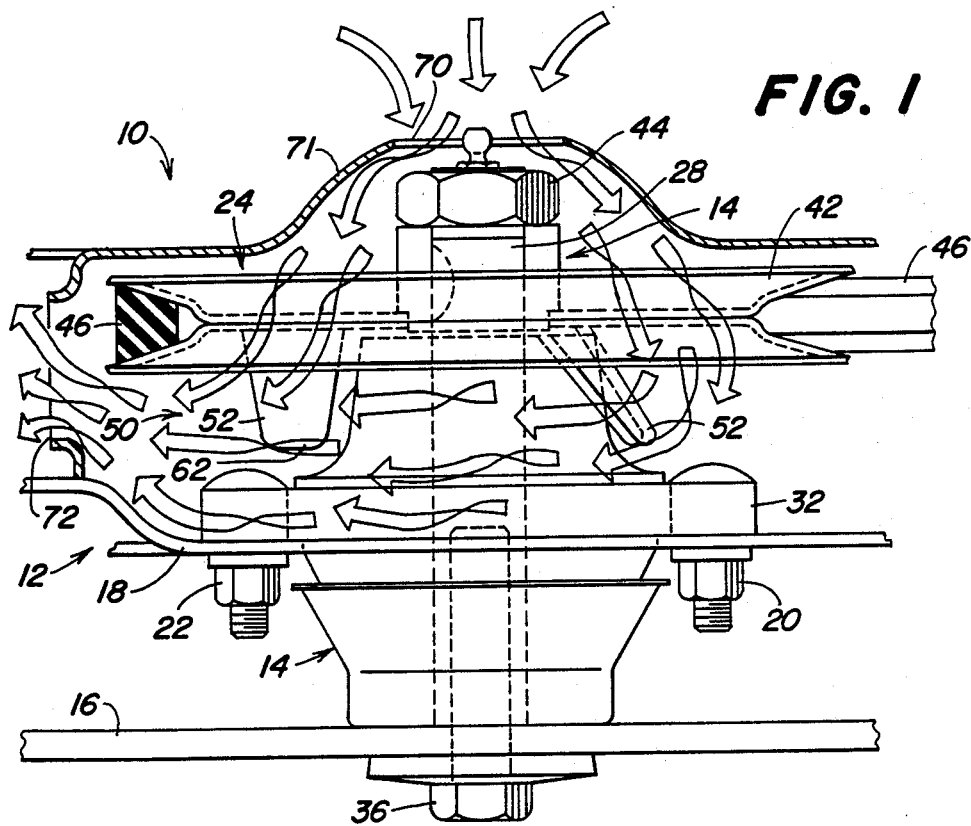
FIG. 1 is a view of a portion of a mower deck assembly, with the deck structure of the present invention attached thereto, showing the air flow around the blade spindle area.

Referring to the FIG. 1, therein is shown a portion of a mower deck assembly 10 which includes a deck housing 12 supporting one or more spindle assemblies 14. Each spindle assembly 14 carries a mower blade 16 for rotation about an upright axis. The spindle assembly 14 is mounted in a spindle mounting housing 20 connected to a support plate or shield structure 18 by fasteners 22. The mower blade 16 is driven through the spindle assembly 14 by a drive train arrangement indicated generally at 24.

The spindle assembly 14 is of generally conventional construction and includes a spindle 28 mounted for rotation in the mounting housing 20. The blade 16 is connected to the lower end of the spindle 28 by a bolt 36 threaded into the spindle.

The drive train 24 includes a driven sheave 42 connected to the top of the blade spindle 28 by a nut 44. The sheave 42 is driven by a belt 46 to rotate the spindle 28 and the mower blade 16.

Figure 3:
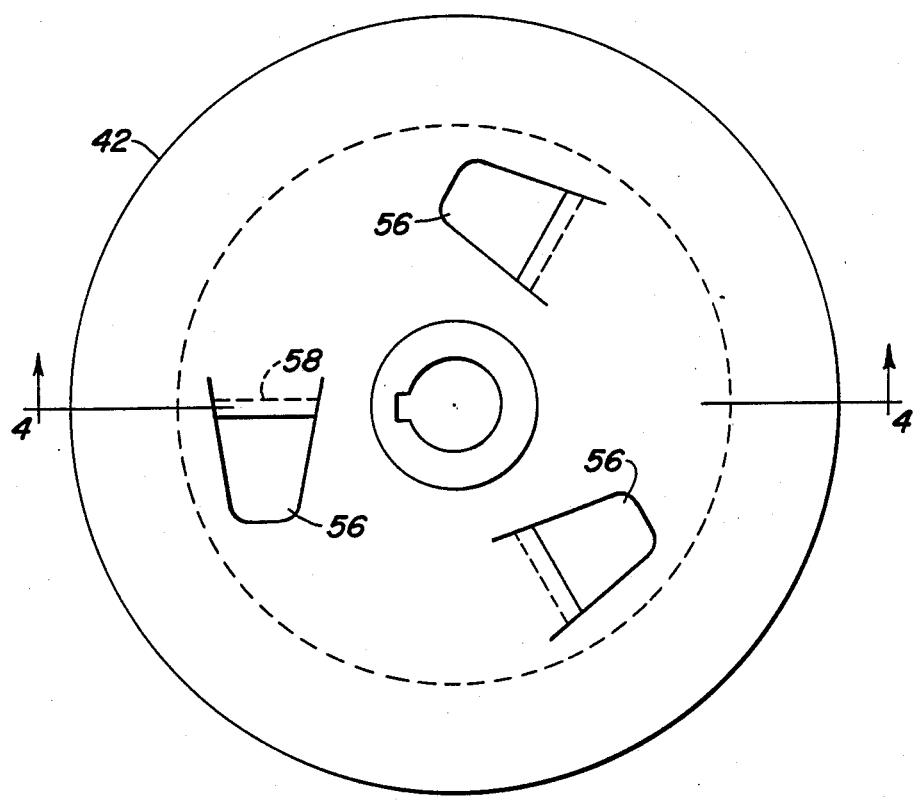
FIG. 3 is a top view of the driven sheave of FIG. 1.
Figure 4:
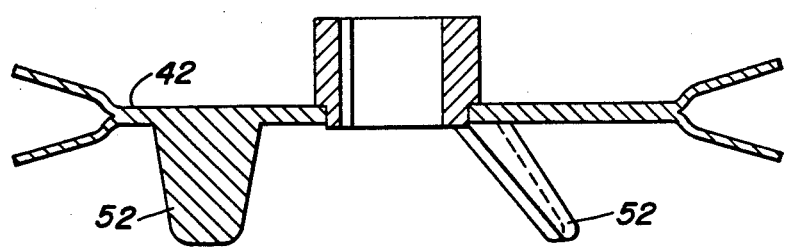
FIG. 4 is a sectional view taken essentially along lines 4—4 of FIG. 3.

To create an air flow around the spindle assembly 14 and the shield structure 18, a fan arrangement indicated generally at 50 is located adjacent the spindle driven sheave 42. As shown in FIG. 1 and FIGS. 3 and 4, the fan arrangement 50 includes a plurality of vanes 52 projecting downwardly from the lower side of the sheave 42. As best seen in FIG. 3, the vanes 52 are spaced an equal distance from the central portion of the sheave 42 and are formed integrally therewith, projecting downwardly from corresponding apertures 56. The vanes 52 are bent downwardly from generally radially extending lines and narrow slightly from the base at the sheave 42 to the lower end. As seen in FIG. 1, the vanes 52 generally conform to the shape of and lie slightly outwardly of the spindle mounting housing 20 when the sheave 42 is attached to the spindle 28.

As the driven sheave 42 is rotated by the belt 46, the downwardly projecting vanes 52 create an air turbulence (FIG. 1) around the spindle assembly 14. The turbulence, which is generally toroidal in shape, prevents grass clippings and other debris from accumulating around the spindle assembly 14 and moves the debris away from the spindle assembly and the deck housing 12. As best seen in FIG. 1, an air current is set up through the deck housing which draws air in from a first port 70 in the drive cover (indicated generally at 71) located above the spindle and exhausts the air and debris from a second port 72 at the high pressure side of the cover 71 to cool and help prevent accumulation of debris in the drive train area 24. Preferably, the low pressure port 70 is axially aligned with the spindle axis and the high pressure port 72 is offset radially from the sheave 42. The passage of air through the ports 70 and 72 enhances the air turbulence to increase its cooling and cleaning effects. The port 70 also serves as an access area for lubricating the spindle.

Figure 2:
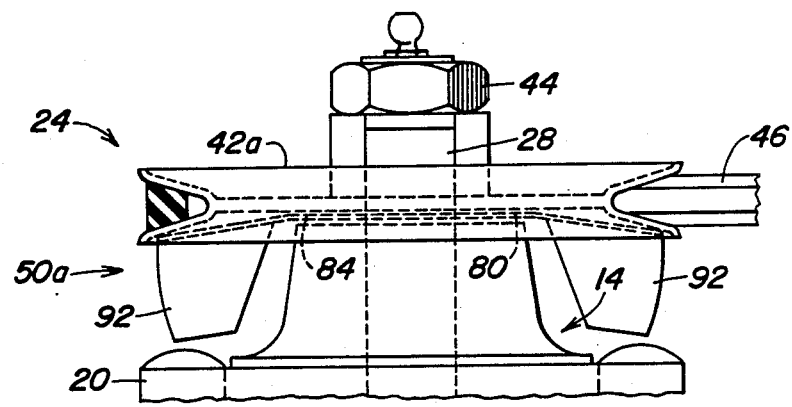
FIG. 2 is a view similar to FIG. 1 but showing an alternate embodiment wherein the fan structure is retrofitted onto an existing driven sheave.
Figure 5:
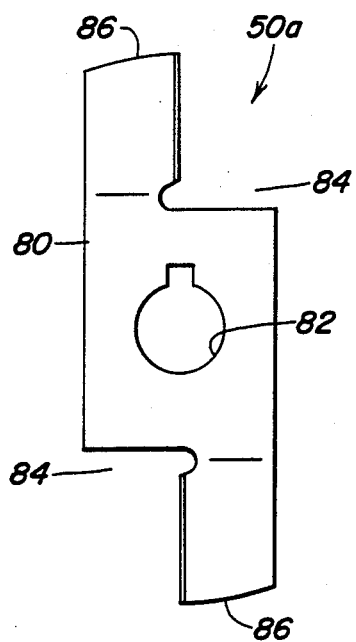
FIG. 5 is a top view of the fan structure for the driven sheave of FIG. 2.
Figure 6:
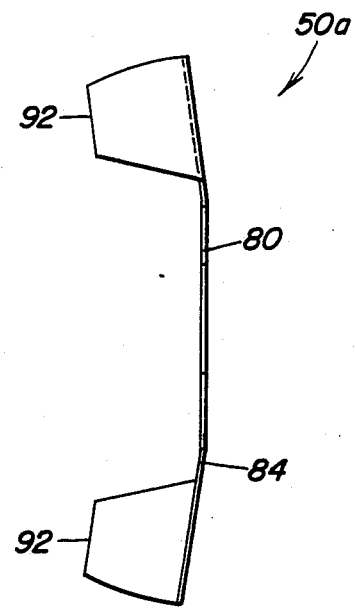
FIG. 6 is a side view of the fan structure of FIG. 5.

In the alternate embodiment of FIG. 2 and FIGS. 5 and 6, the fan arrangement 50a includes a unitary add-on structure 80 generally in the form of a blade-like element having a central keyed aperture 82 which is received over the spindle 28 and keyed thereto for rotation with the sheave 42a. The structure 80 is notched at leading edge locations 84 inwardly from the rounded outermost edges 86. Vanes 92 are bent downwardly adjacent the notches about a bend line which extends radially through the center of the structure 80 (FIG. 5). The outer ends of the structure 80 are then bent downwardly (FIG. 6) a slight amount from the plane of the remainder of the structure 80 about bend lines which extend through the notches 84 perpendicular to the radially extending bend line passing through the center of the structure 80. As can be best appreciated from FIG. 2, the above-described structure 80 fits compactly under and conforms generally to the shape of the sheave 42a. The fan arrangement 50a provides a generally toroidal current of air in a manner similar to that described above for the fan arrangement 50. The structure 80 is particularly useful in retrofitting existing driven sheaves 42a with fan structure for providing the air currents which prevent buildup of material in the spindle area and which help expel dirt and debris from the drive train area 24.

Having described the preferred embodiment, it will be apparent that modifications can be made without departing from the scope of the invention as defined in the accompanying claims.

I claim:

1. Mower deck structure including a housing and a blade-supporting spindle mounted for rotation in the housing, a spindle drive, a sheave connected to the spindle; and means creating an air turbulence around the spindle for preventing debris buildup around the spindle, wherein the means creating an air turbulence around the spindle includes fan structure connected for rotation with the spindle, said fan structure including protrusions extending from the sheave in the direction of the spindle axis.

2. The invention as set forth in claim 1 wherein the means creating an air turbulence around the spindle includes fan structure connected for rotation with the spindle.

3. The invention as set forth in claim 1 wherein the housing includes a drive cover with a port located adjacent the spindle, said means for creating an air turbulence located adjacent the port for creating an air flow through the port to direct debris away from the spindle drive.

4. The invention as set forth in claim 1 wherein the sheave includes a hub, and the fan structure comprises a blade-like member selectively securable to the hub for rotation with the sheave.

5. The invention as set forth in claim 1 wherein the sheave includes apertures and the fan structure is located adjacent the sheave apertures for directing air through the sheave.

6. The invention as set forth in claim 5 wherein the fan structure comprises a tab-like member bent downwardly from the sheave.

7. Mower deck structure including a housing and a blade-supporting spindle mounted for rotation in the housing, a spindle drive including a sheave fixed to the spindle for rotation therewith, and fan structure connected to the sheave for creating a flow of air around the spindle to direct debris away from the spindle.

8. The invention as set forth in claim 7 including a drive shield having a port, and means supporting the fan structure adjacent the shield for directing air through the port and the spindle drive to remove debris from the spindle drive.

9. The invention as set forth in claim 8 wherein the fan structure is connected for rotation about the axis of rotation of the spindle.

10. The invention as set forth in claim 9 wherein the fan structure includes members projecting axially from the sheave for creating an air turbulence around the sheave.

11. The invention as set forth in claim 10 wherein the sheave is apertured and the projecting members include tab-like projections located adjacent the apertures.

12. The invention as set forth in claim 7 including a drive shield having a first port located adjacent the spindle, a second port offset from the first port, and means supporting the fan structure for creating relative low and high pressure areas at the respective first and second ports.

13. The invention as set forth in claim 12 wherein the first port is axially aligned with the spindle and the second port is offset radially from the spindle.

14. Mower deck structure including a housing and a blade-supporting spindle mounted for rotation about an axis in the housing, a spindle drive including a sheave fixed to the spindle for rotation therewith, and fan structure for creating a flow of air around the spindle to direct debris away from the spindle, the fan structure comprising:

a blade-like element including a planar central portion with an aperture adapted for receiving the spindle therethrough, and opposite end portions including vanes offset from the central portion; and means supporting the element for rotation with the shaft about the shaft axis with the vanes projecting in the axial direction.

15. The invention as set forth in claim 14 wherein the spindle supports a sheave with an axially concave central area, and the blade-like element is partially contained within the central area with the vanes projecting axially from the central area.

* * * * *